US012538043B2

(12) United States Patent
Ishikawa

(10) Patent No.: US 12,538,043 B2
(45) Date of Patent: Jan. 27, 2026

(54) IMAGE CAPTURING APPARATUS AND CONTROL METHOD THEREOF, IMAGE PROCESSING APPARATUS AND STORAGE MEDIUM

(71) Applicant: CANON KABUSHIKI KAISHA, Tokyo (JP)

(72) Inventor: Naoki Ishikawa, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 97 days.

(21) Appl. No.: 18/436,786

(22) Filed: Feb. 8, 2024

(65) Prior Publication Data

US 2024/0276113 A1 Aug. 15, 2024

(30) Foreign Application Priority Data

Feb. 15, 2023 (JP) .................. 2023-021870

(51) Int. Cl.
*H04N 25/59* (2023.01)
*H04N 25/78* (2023.01)

(52) U.S. Cl.
CPC ............. *H04N 25/59* (2023.01); *H04N 25/78* (2023.01)

(58) Field of Classification Search
CPC ........ H04N 25/59; H04N 25/78; H04N 25/00; H04N 25/40; H04N 25/671; H04N 25/711; H04N 25/77; H04N 25/771; H04N 25/589; H04N 25/57; H04N 23/70
See application file for complete search history.

(56) References Cited

U.S. PATENT DOCUMENTS

| | | | | |
|---|---|---|---|---|
| 11,128,823 B2 * | 9/2021 | Machida | .............. | H04N 25/589 |
| 2013/0135486 A1 * | 5/2013 | Wan | .................. | H04N 5/765 |
| | | | | 348/207.99 |
| 2017/0353675 A1 * | 12/2017 | Onuki | .................. | H04N 13/327 |
| 2019/0028664 A1 * | 1/2019 | Ishii | ................ | H04N 25/65 |
| 2022/0021796 A1 | 1/2022 | Karahashi | | |

FOREIGN PATENT DOCUMENTS

JP 2017-220896 A 12/2017

OTHER PUBLICATIONS

The above patent documents was cited in a European Search Report issued on Jun. 12, 2024, which is enclosed, that issued in the corresponding European Patent Application No. 24153393.4.

* cited by examiner

*Primary Examiner* — Nhan T Tran
(74) *Attorney, Agent, or Firm* — Cowan, Liebowitz & Latman, P.C.

(57) ABSTRACT

An image capturing apparatus comprises a plurality of pixels and a correction unit. Each pixel includes: a photoelectric converter; first and second charge holding sections to hold charges obtained with first and second charge accumulation periods in a first frame; third and fourth charge holding sections to hold charges obtained with the first and second charge accumulation periods in a second frame; a first floating diffusion portion for reading out charges held in the first and second charge holding sections in the second frame; and a second floating diffusion portion for reading out charges held in the third and fourth charge holding sections in the first frame. The correction unit corrects a difference between signal levels of signals read out via the first and second floating diffusion portions based on a difference between capacitances of the first and second floating diffusion portions.

15 Claims, 13 Drawing Sheets

IMAGE CAPTURING APPARATUS AND CONTROL METHOD THEREOF, IMAGE PROCESSING APPARATUS AND STORAGE MEDIUM

BACKGROUND OF THE INVENTION

Field of the Invention

The present invention relates to an image capturing apparatus and control method thereof, image processing apparatus and storage medium.

Description of the Related Art

Among the so-called CMOS image sensors, there is a GS sensor that has a memory section (charge holding section) in each pixel which realizes a global shutter (hereinafter referred to as "GS") function. Each pixel of the GS sensor includes a gate that transfers signal charges accumulated in a photoelectric conversion unit to a charge holding section. In the GS sensor, the GS function is basically realized by simultaneously transferring charge from all photoelectric conversion units to the charge storage sections, and by making the start and end timings of charge accumulation in the photoelectric conversion units the same for all pixels.

In addition, by configuring a plurality of charge holding sections for one photoelectric conversion unit and transferring charge to the charge holding sections multiple times during one frame period, it is possible to obtain a plurality of images based on charges accumulated during different total charge accumulation periods and transferred to the different charge holding sections. Then, by composing the plurality of obtained images, it is possible to obtained an image with the improved dynamic range.

US-2013-0135486 discloses a configuration of a GS pixel having a plurality of charge holding sections for one photoelectric conversion unit. Furthermore, Japanese Patent Laid-Open No. 2017-220896 discloses that two charge holding sections are provided for one photoelectric conversion unit, and charge generated in the photoelectric conversion unit is held alternately in the two charge holding sections for each frame period, and the charge is output to an output unit from one of the two charge holding sections during a period in which charge is not transferred from the photoelectric conversion unit to the charge holding section. This makes it possible to accumulate charge even during the readout period, thereby realizing the GS function.

However, in order to improve the dynamic range, if charges are held in two charge holding sections for different accumulation periods, while the accumulated charges are being read out, both charge holding sections hold charges, so it is unable for the charge holding sections to newly hold charges in the next frame. As a result, there are frames in which no signal can be obtained.

Therefore, in order that charge of the next frame can be accumulated while reading out charges from the charge holding sections, the following configuration further having a plurality of charge holding sections in addition to the plurality of charge holding sections from which charges are being read out may be considered.

First, with respect to one photoelectric conversion unit, four charge holding sections and two floating diffusion units (FD) are provided, and each photoelectric conversion unit is connected to the four charge holding sections. Further, one of the two FD is connected to two charge holding sections, and the other FD is connected to the other two charge holding sections. Such a configuration makes it possible to transfer the charge accumulated in the photoelectric conversion unit to two charge holding sections while reading out the charges from the other two charge holding sections.

Using the above configuration, in an arbitrary frame, charge from the photoelectric conversion unit is transferred to and accumulated in the two charge holding sections in different accumulation periods while charges are transferred to the FD from the two other charge holding sections in which charge had been accumulated, and an image signal is generated. In the next frame, charge is accumulated in the two charge holding sections from which charges had been transferred to the FD in the previous frame while charges are transferred from the two charge holding sections in which charge had been accumulated in the previous frame to the other FD, and an image is generated. By controlling the configuration in this manner, an image with a high dynamic range can be obtained without producing a frame in which charge cannot be accumulated.

However, in the above-described configuration, the FDs to which changes transferred from the charge holding sections differ for each frame. Therefore, due to variations in FD capacitance, a difference occurs in the signal level even if the amount of accumulated charge is the same, and a problem arises in that the luminance of the finally output image also differs from frame to frame.

SUMMARY OF THE INVENTION

The present invention has been made in consideration of the above situation, and high dynamic range images can be acquired in successive frames while suppressing the occurrence of luminance fluctuations between frames.

According to the present invention, provided is an image capturing apparatus comprising: a plurality of pixels; and a correction unit, wherein each pixel includes: a photoelectric converter that photoelectrically converts incident light into charge and accumulates the charge; first and second charge holding sections that hold charges obtained by the photoelectric converter with first and second charge accumulation periods, respectively, in a first frame; third and fourth charge holding sections that hold charges obtained by the photoelectric converter with the first and second charge accumulation periods, respectively, in a second frame following the first frame; a first floating diffusion portion used for reading out first and second signals corresponding to charges held in the first and second charge holding sections, respectively, in the second frame; and a second floating diffusion portion used for reading out third and fourth signals corresponding to charges held in the third and fourth charge holding sections, respectively, in the first frame, wherein the correction unit corrects a difference between signal levels of a pair of signals corresponding to charges obtained in a predetermined charge accumulation period with a same amount of incident light and read out via the first and second floating diffusion portions based on a difference between capacitances of the first and second floating diffusion portions.

Further, according to the present invention, provided is an image processing apparatus for processing a signal output from an image capturing apparatus comprising a plurality of pixels, each pixel including: a photoelectric converter that photoelectrically converts incident light into charge; first and second charge holding sections that hold charges obtained by the photoelectric converter with first and second charge accumulation periods, respectively, in a first frame; third and fourth charge holding sections that hold charges obtained by the photoelectric converter with the first and second charge accumulation periods, respectively, in a second frame following the first frame; a first floating diffusion portion used for reading out first and second signals corresponding to charges held in the first and second charge holding sections, respectively, in the second frame; and a second floating diffusion portion used for reading out third and fourth signals corresponding to charges held in the third and fourth charge holding sections, respectively, in the first frame, the image processing apparatus comprising a correction unit that corrects a difference between signal levels of a pair of signals corresponding to charges obtained in a predetermined charge accumulation period with a same amount of incident light and read out via the first and second floating diffusion portions based on a difference between capacitances of the first and second floating diffusion portions.

Furthermore, according to the present invention, provided is an control method of an image capturing apparatus having a plurality of pixels, each pixel including: a photoelectric converter that photoelectrically converts incident light into charge and accumulates the charge; first and second charge holding sections that hold charges obtained by the photoelectric converter with first and second charge accumulation periods, respectively, in a first frame; third and fourth charge holding sections that hold charges obtained by the photoelectric converter with the first and second charge accumulation periods, respectively, in a second frame following the first frame; a first floating diffusion portion used for reading out first and second signals corresponding to charges held in the first and second charge holding sections, respectively, in the second frame; and a second floating diffusion portion used for reading out third and fourth signals corresponding to charges held in the third and fourth charge holding sections, respectively, in the first frame, the method comprising correcting a difference between signal levels of a pair of signals corresponding to charges obtained in a predetermined charge accumulation period with a same amount of incident light and read out via the first and second floating diffusion portions based on a difference between capacitances of the first and second floating diffusion portions.

Further, according to the present invention, provided is a non-transitory computer-readable storage medium, the storage medium storing a program that is executable by the computer, wherein the program includes program code for causing the computer to function as an image processing apparatus for processing a signal output from an image capturing apparatus comprising a plurality of pixels, each pixel including: a photoelectric converter that photoelectrically converts incident light into charge; first and second charge holding sections that hold charges obtained by the photoelectric converter with first and second charge accumulation periods, respectively, in a first frame; third and fourth charge holding sections that hold charges obtained by the photoelectric converter with the first and second charge accumulation periods, respectively, in a second frame following the first frame; a first floating diffusion portion used for reading out first and second signals corresponding to charges held in the first and second charge holding sections, respectively, in the second frame; and a second floating diffusion portion used for reading out third and fourth signals corresponding to charges held in the third and fourth charge holding sections, respectively, in the first frame, the image processing apparatus comprising a correction unit that corrects a difference between signal levels of a pair of signals corresponding to charges obtained in a predetermined charge accumulation period with a same amount of incident light and read out via the first and second floating diffusion portions based on a difference between capacitances of the first and second floating diffusion portions.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Figure 1:
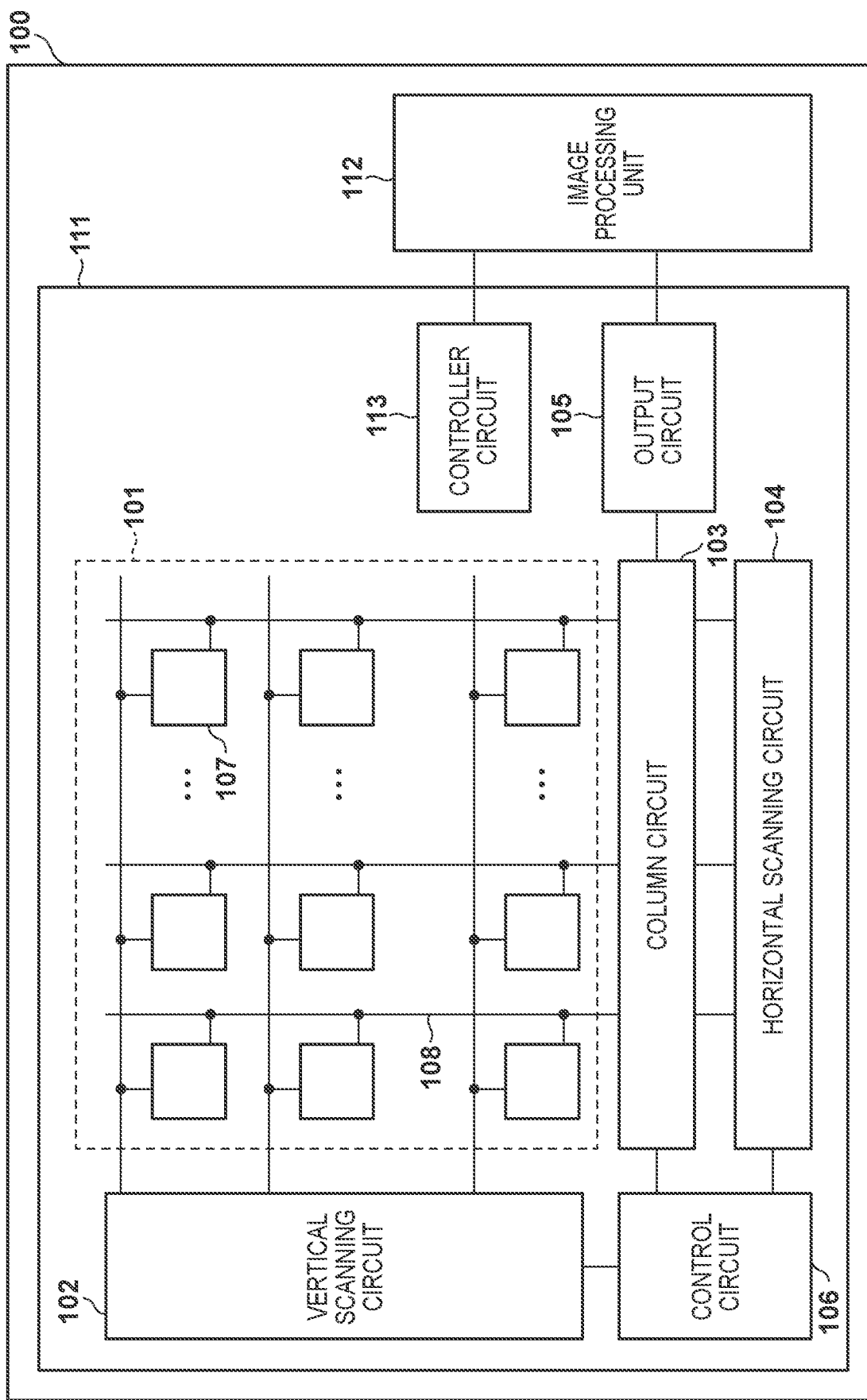
FIG. 1 is a block diagram illustrating a schematic configuration of an image capturing apparatus according to a first embodiment of the present invention.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

In the following embodiments, the signal carriers are electrons, the signal accumulation layer is N-type, and transistors forming the circuits are N-type MOS transistors unless otherwise specified. However, the present invention is not limited to this, and it is also possible to use holes as the signal carriers, use P-type signal accumulation layer, and P-type MOS transistors.

Further, in the following embodiments, The GS sensor is assumed in which each pixel includes a photoelectric conversion unit, charge holding sections, transfer MOS transistors for transferring the charge of the photoelectric conversion unit to the charge holding sections, amplification MOS transistors for amplifying and outputting the charge, and transfer MOS transistors for transferring the charge held in the charge holding sections to the amplification MOS transistors.

First Embodiment

FIG. 1 is a block diagram showing a schematic configuration of an image capturing apparatus 100 according to the first embodiment. The image capturing apparatus 100 includes an image sensor (CMOS image sensor) 111 and an image processing unit 112. The image sensor 111 includes a pixel section 101, a vertical scanning circuit 102, a column circuit 103, a horizontal scanning circuit 104, an output circuit 105, a control circuit 106, and a controller circuit 113.

The controller circuit 113 is an interface unit to the image processing unit 112, communicates with the image processing unit 112 through serial communication, and receives control signals for the image sensor 111 from the image processing unit 112. The image processing unit 112, for example, obtains the luminance based on the pixel signal output from the image sensor 111, and determines exposure values such as the aperture and exposure period (charge accumulation period) based on the obtained luminance. Then, the determined exposure period is transmitted to the controller circuit 113 as a control signal, and the controller circuit 113 transmits the received control signal to the control circuit 106.

The pixel section 101 is a pixel array including a plurality of pixels 107 two-dimensionally arranged in a plurality of rows and a plurality of columns in a plan view of the substrate.

The vertical scanning circuit 102 controls the plurality of pixels 107 by supplying control signals to the plurality of transistors included in each pixel 107 to control on (conducting state) or off (non-conducting state) of these transistors.

A signal line 108 is provided in each column of the pixel section 101, and signals from the pixels 107 are output to the signal lines 108 of the respective columns in units of rows. The column circuit 103 includes amplifiers for amplifying the pixel signals output to the signal lines 108 and AD conversion circuits for converting the analog signals to digital signals. The horizontal scanning circuit 104 supplies a control signal to the switches of the column circuit 103 to turn on/off the switches and controls the pixel signals processed by the column circuit 103 in units of rows to be output to the output circuit 105.

The control circuit 106 controls the vertical scanning circuit 102, the column circuit 103, and the horizontal scanning circuit 104. At this time, the control circuit 106 can control the charge accumulation period of the pixels 107 by controlling the vertical scanning circuit 102 based on the control signals sent from the controller circuit 113, for example.

The output circuit 105 has a serializer function, converts the pixel signals from the column circuit 103 into a serial signal, and outputs it.

The pixel signal output from the output circuit 105 is input to the image processing unit 112, which performs development processing such as various adjustment/correction processing on the pixel signal, and outputs the developed pixel signal to the monitor, or records it on a recording medium. Furthermore, as described above, it is also possible to determine the exposure values and detect the focus state based on the pixel signal.

Figure 2:
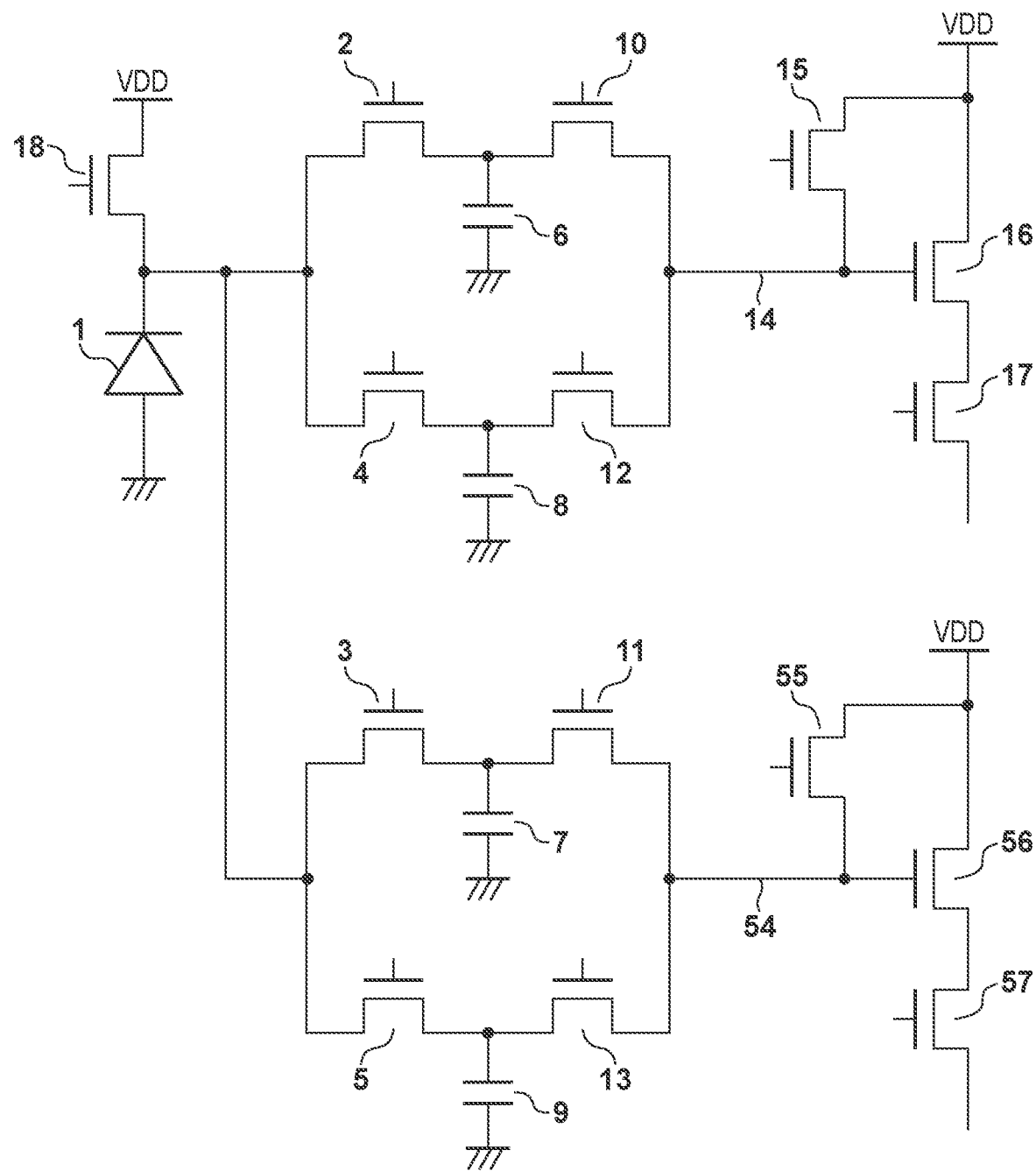
FIG. 2 is an equivalent circuit diagram illustrating the configuration of a pixel according to the first embodiment.

FIG. 2 is an equivalent circuit diagram showing the configuration of each pixel 107 in this embodiment.

In FIG. 2, a photodiode (PD) 1 shows an example of a photoelectric conversion unit. A transfer unit (GS_LA) 2, a transfer unit (GS_LB) 3, a transfer unit (GS_SA) 4, and a transfer unit (GS_SB) 5 are configured of, for example, MOS transistors.

GS_LA 2, when turned on, transfers the charge generated by PD 1 to a charge holding secdion (MEM_LA) 6. GS_LB 3, when turned on, transfers the charge generated by PD 1 to a charge holding section (MEM_LB) 7. Furthermore, GS_SA 4, when turned on, transfers the charge generated by PD 1 to a charge holding section (MEM_SA) 8. GS_SB 5, when turned on, transfers the charge generated by PD 1 to a charge holding section (MEM_SB) 9.

A transfer unit (TX_LA) 10, a transfer unit (TX_LB) 11, a transfer unit (TX_SA) 12, and a transfer unit (TX_SB) 13 are configured of, for example, MOS transistors.

For example, floating diffusion regions (FDs) arranged on a semiconductor substrate can be used as input nodes 14 and 54 of amplification units which will be described later.

TX_LA 10, when turned on, transfers the charge held in MEM_LA 6 to FD 14. TX_LB 11, when turned on, transfers the charge held in MEM_LB 7 to FD 54. Furthermore, TX_SA 12, when turned on, transfers the charge held in MEM_SA 8 to FD 14. TX_SB 13, when turned on, transfers the charge held in MEM_SB 9 to FD 54.

Then, FD 14 and FD 54 temporarily hold charges transferred from MEM_LA 6, MEM_LB 7, MEM_SA 8, and MEM_SB 9 via TX_LA 10, TX_LB 11, TX_SA 12, and TX_SB 13, respectively.

A reset switch (RES) 15 and a reset switch (RES) 55 are configured by, for example, MOS transistors, and, when turned on, can reset FD 14 and FD 54 to the power supply voltage VDD.

An amplification unit 16 and an amplification unit 56 amplify voltages corresponding to the charges transferred to FD 14 and FD 54, respectively, and output the amplified voltages to the outside. Here, a source follower circuit (SF) using a MOS transistor is shown as an example, and a configuration in which the gate of the MOS transistor and the floating diffusion region are electrically connected can be used.

A selection unit (SEL) 17 and a selection unit (SEL) 57 are configured by, for example, MOS transistors, and when turned on, the corresponding pixel 107 is selected, and the voltage amplified by SF 16 or SF 56 is output to the signal line 108 connected to the pixel 107.

A discharge unit (OFG) 18 is configured to discharge unnecessary charges from PD 1, and may be configured by, for example, a MOS transistor. In this case, a semiconductor region having the same polarity as the charge and forming part of PD 1 is used as a source, and a semiconductor region (an overflow drain (OFD) region) to which power supply voltage VDD is applied is used as a drain.

Next, a method for controlling the image sensor 111 in this embodiment will be explained using FIGS. 3 and 4.

Figure 3:
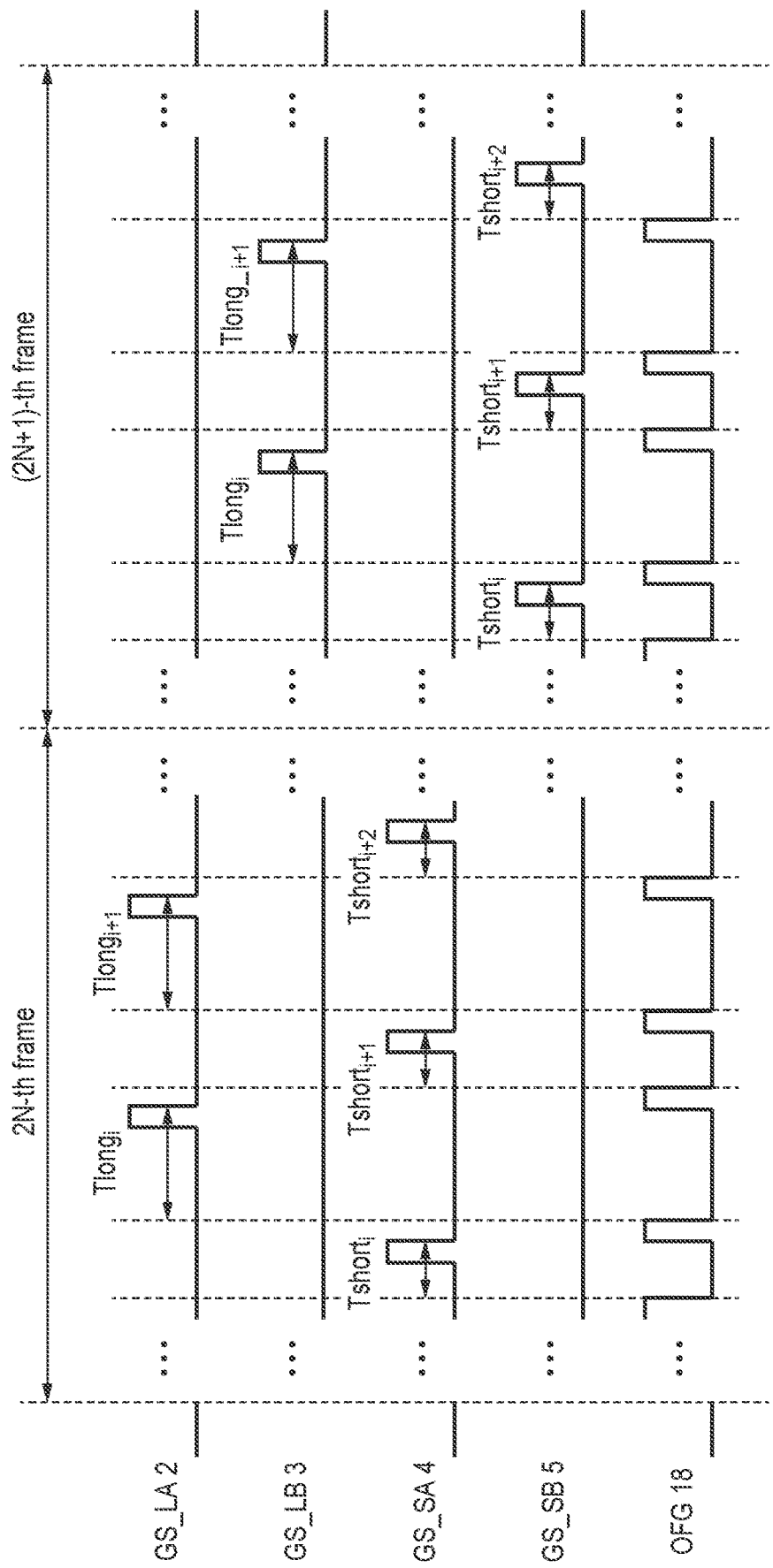
FIG. 3 is a timing chart illustrating charge accumulation control in the first embodiment.
Figure 4:
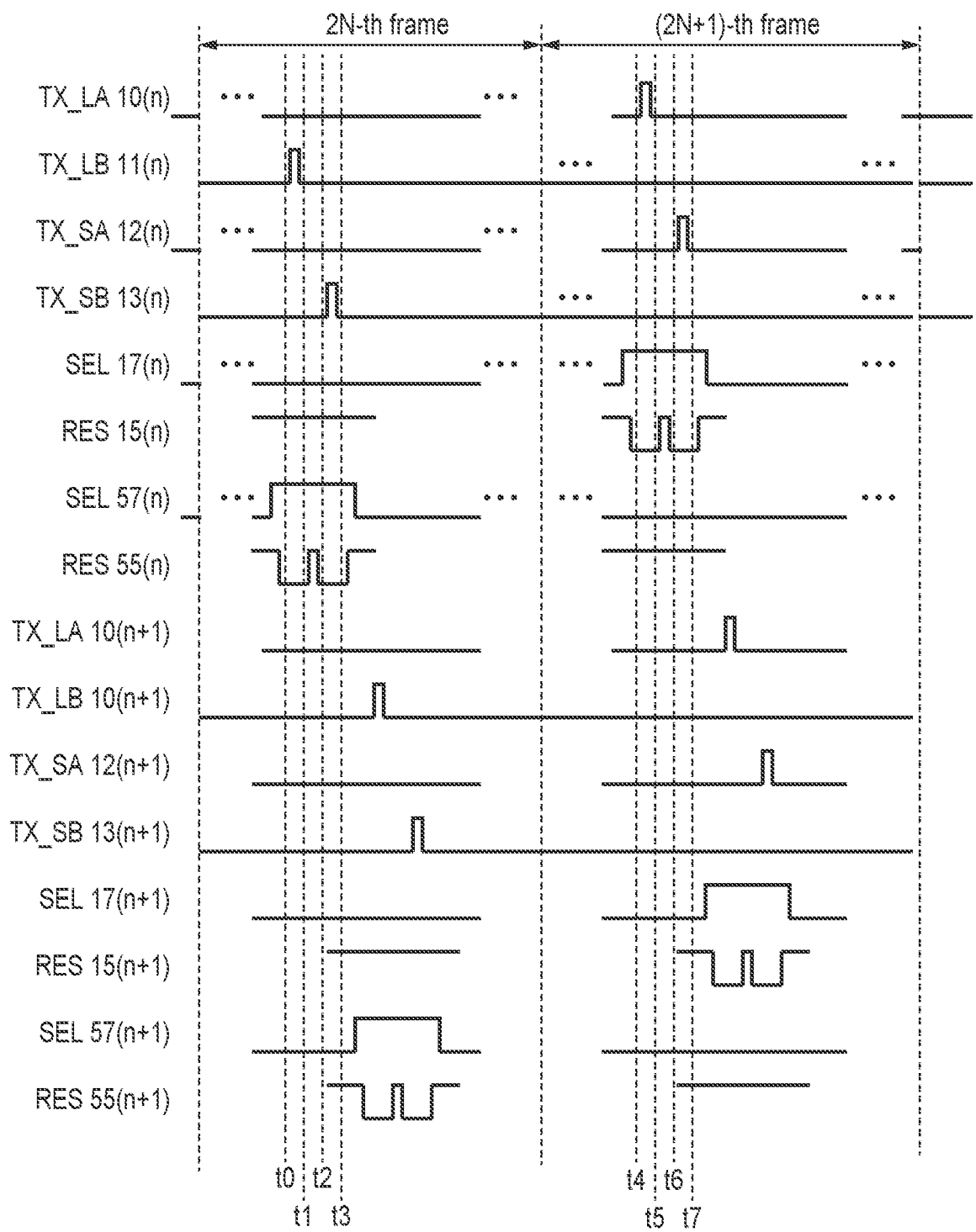
FIG. 4 is a timing chart illustrating signal readout control in the first embodiment.

FIGS. 3 and 4 show in chronological order the transition of the actuation pulses supplied to the control electrodes of each transistor shown in FIG. 2. FIG. 3 shows the actuation pulses related to exposure, and FIG. 4 shows the actuation pulses related to readout. When the actuation pulse shown in FIGS. 3 and 4 is High, each transistor is turned on.

Note that the subscripts (n, n+1) in FIG. 4 indicate pixel row numbers (n-th row, n+1-th row). This is because the control timings of TX_LA 10, TX_LB 11, TX_SA 12, TX_SB 13, SEL 17, SEL 57, RES 15, and RES 55 related to readout differ row by row. Although control of two rows will be described here, control of three or more rows is realized by repeating the control pattern shown in FIG. 4. On the other hand, since the image sensor 111 is controlled by the GS method in this embodiment, the actuation timings related to exposure is the same for all pixels.

Charge Accumulation Control in Even Frames

First, charge accumulation control in even frames (2N-th frames) will be explained.

In even frames, the charge generated in PD 1 of each pixel 107 is transferred to MEM_LA 6 and MEM_SA 8, and the charges held in MEM_LB 7 and MEM_SB 9 in the previous frame are read out.

During a certain period of one frame period, light incident on PD 1 is photoelectrically converted into charge, accumulated in PD 1, and transferred to MEM_LA 6 or MEM_SA 8 via GS_LA 2 or GS_SA 4. This charge transfer operation is performed a plurality of times during one frame period.

Tshort$_i$ shown in FIG. 3 indicates a charge accumulation period corresponding to the i-th charge transfer among charge transfers that are repeated a plurality of times, for example, Nshort times, during an even frame period. Each charge accumulation period is a period from when a reset state of PD 1 is released by turning OFG 18 on and off, through a period when GS_SA 4 is turned on and the generated charge is transferred from PD 1 to MEM_SA 8, to when GS_SA4 is turned off. Although PD 1 is reset using the OFG 18, if the configuration is such that no charge remains in PD 1 during transfer, the reset using the OFG 18 may be omitted. In that case, the charge accumulation period Tshort$_i$ corresponds to a period from when the immediately preceding charge transfer operation is completed to when GS_SA 4 is turned off.

A total charge accumulation period Tshort corresponding to the charge accumulated in the MEM_SA 8 in an even frame is the period obtained by adding the charge accumulation periods Tshort$_i$ from i=1 to i=Nshort. Note that each charge accumulation period Tshort$_i$ may be the same or different between i=1 to i=Nshort, as long as the total charge accumulation period Tshort becomes a predetermined period.

Further, Tlong$_i$ shown in FIG. 3 indicates a charge accumulation period corresponding to the i-th charge transfer among charge transfers that are repeated a plurality of times, for example, Nlong times, during an even frame period. Each charge accumulation period is a period from when a reset state of PD 1 is released by turning OFG 18 on and off, through a period when GS_LA 2 is turned on and the generated charge is transferred from PD 1 to MEM_LA 6, to when GS_LA 2 is turned off. Although PD 1 is reset using the OFG 18, if the configuration is such that no charge remains in PD 1 during transfer, the reset using the OFG 18 may be omitted. In that case, the charge accumulation period Tlong$_i$ corresponds to a period from when the immediately preceding charge transfer operation is completed to when GS_LA 2 is turned off.

A total charge accumulation period Tlong corresponding to the charge accumulated in MEM_LA 6 in an even frame is the period obtained by adding the charge accumulation periods Tlong$_i$ from i=1 to i=Nlong. Note that each charge accumulation period Tlong$_i$ may be the same or different between i=1 to i=Nlong, as long as the total charge accumulation period Tlong becomes a predetermined period.

Charge Accumulation Control in Odd Frames

Next, charge accumulation control in odd frames ((2N+1)-th frames) will be explained.

In odd frames, the charge generated in PD 1 of each pixel 107 is accumulated in MEM_LB 7 and MEM_SB 9, and the charges held in MEM_LA 6 and MEM_SA 8 in the previous frame are read out.

During a certain period of one frame period, light incident on PD 1 is photoelectrically converted into charge, accumulated in PD 1, and transferred to MEM_LB 7 or MEM_SB 9 via GS_LB 3 or GS_SB 5. This charge transfer operation is performed a plurality of times during one frame period, similarly to even frames. Note that the control timings of GS_LB 3, GS_SB 5, and OFG 18 in odd frames are the same as the control timings of GS_LA 2, GS_SA 4, and OFG 18 in even frames, and therefore description thereof will be omitted. Further, the charge accumulation period Tshort$_i$ and charge accumulation period Tlong$_i$ are also the same as those of even frames, so explanations thereof will be omitted.

Note that by making the total charge accumulation period Tlong and the total charge accumulation period Tshort different from each other in each of even and odd frames, it is possible to obtain two types of images with different effective exposure amounts in each frame. By adjusting the signal of one of these two types of images according to the charge accumulation periods and combining the images, one image with a high dynamic range can be obtained.

Furthermore, as mentioned above, by performing charge transfer from PD 1 a plurality of times during each frame, it is possible to suppress jitter between frames during moving image shooting, compared to transferring charge corresponding to the same charge accumulation period all at once. This is because the exposure period in one frame is dispersed evenly, and is particularly effective for shooting subjects that move at high speed within the screen or for shooting blinking light sources.

Signal Readout Control in Even Frames

Next, signal readout control in even frames will be described with reference to FIG. 4. Although not shown, the charges transferred to MEM_LBs 7 and MEM_SBs 9 in the immediately previous odd frame ((2N−1)-th frame) will be read out. Here, signal readout from the pixels 107 in the n-th row in a row-sequential reading manner will be explained.

First, SELs 57(n) are turned on so that the voltage corresponding to the charges in FDs 54 of the pixels 107 in the n-th row can be read out. Then, RESs 55(n) are turned off and the reset level voltages VRES of FDs 54 are read out (time t0). Next, TX_LBs 11(n) are turned on, the charges held in MEM_LBs 7 are transferred to FDs 54, and the signal levels VSIG of FDs 54 are read out (time t1). The difference between these two signal levels, i.e., |VSIG−VRES|, is a physical quantity proportional to the amount of charge held in each MEM_LB 7.

Thereafter, FDs 54 are reset by turning on the RESs 55(n) again, and the reset level voltages VRES of FDs 54 are read out (time t2). Next, TX_SBs 13(n) are turned on, the charges held in MEM_SBs 9 are transferred to FDs 54, and the signal levels VSIG of FDs 54 are read out (time t3). The difference between these two signal levels, i.e., |VSIG−VRES|, is a physical quantity proportional to the amount of charge held in each MEM_SB 9.

By repeating the above-described operation row-by-row in all or the desired area, the charges held in MEM_LBs 7 and MEM_SBs 9 are read out as pixel signals.

Signal Readout Control in Odd Frames

Next, signal readout control in odd frames will be described with reference to FIG. 4. Note that the charges transferred to MEM_LAs 6 and MEM_SAs 8 in the immediately previous even frame (2N-th frame) are read out. Here, signal readout from the pixels 107 in the n-th row in a row-sequential reading manner will be explained.

First, SELs 17(n) are turned on so that the voltages corresponding to the charges in FDs 14 of the pixels 107 in the n-th row can be read out. Then, RESs 15(n) are turned off and the reset level voltages VRES of FDs 14 are read out (time t4). Next, TX_LAs 10(n) are turned on, the charges held in MEM_LAs 6 are transferred to FDs 14, and the signal levels VSIG of FDs 14 are read out (time t5). The difference between these two signal levels, i.e., |VSIG−VRES|, is a physical quantity proportional to the amount of charge held in each MEM_LA 6.

Thereafter, FDs 14 are reset by turning on the RESs 15(n) again, and the reset level voltages VRES of FDs 14 are read out (time t6). Next, TX_SAs 12(n) are turned on, the charges held in MEM_SAs 8 are transferred to FDs 14, and the signal levels VSIG of FDs 14 are read out (time t7). The difference between these two signal levels, i.e., |VSIG−VRES|, is a physical quantity proportional to the amount of charge held in each MEM_SA 8.

By repeating the above-described operation row-by-row in all or the desired area, the charges held in MEM_LAs 6 and MEM_SAs 8 are read out as pixel signals.

As described above, by configuring each PD1 with two charge storage sections that accumulate signal charges to be transferred and two charge storage sections that hold charges until signal readout of the next frame, in all frames, images captured simultaneously with two different exposure values can be obtained.

Image Synthesis

Next, with reference to FIG. 5, synthesis processing for expanding the dynamic range of images captured with the charge accumulation period Tlong and the charge accumulation period Tshort will be described.

Figure 5:
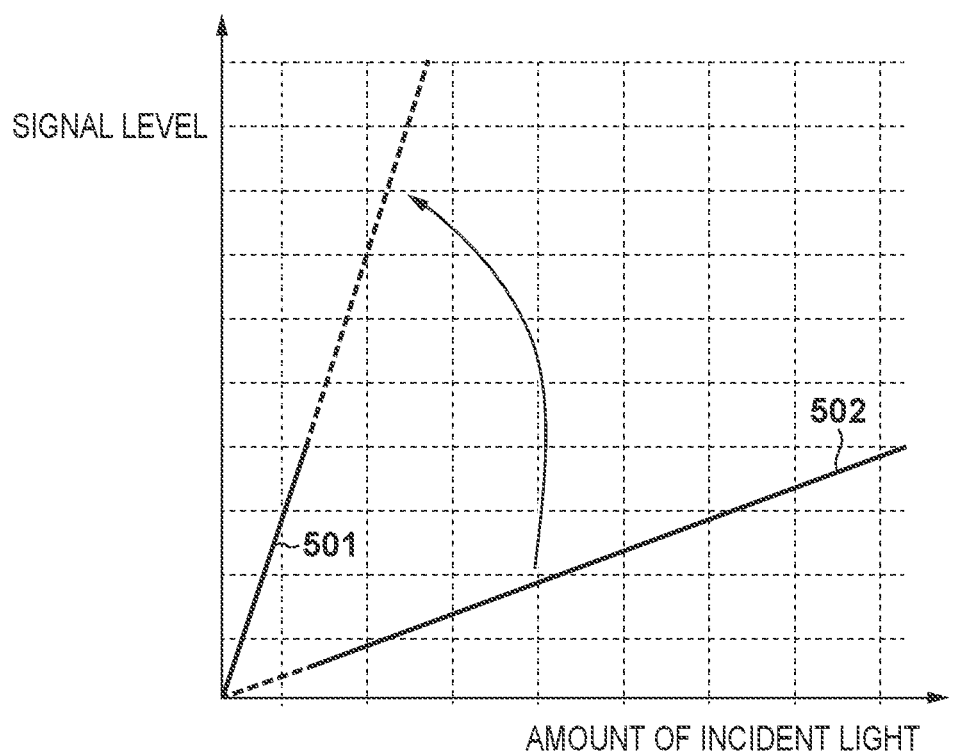
FIG. 5 is a diagram illustrating image synthesis processing for dynamic range expansion in the first embodiment.

In FIG. 5, graphs 501 and 502 indicate signal levels corresponding to the amount of incident light when signals corresponding to charges accumulated in the charge accumulation period Tlong and the charge accumulation period Tshort are read, respectively. Even with the same amount of incident light, as the charge accumulation period Tlong is longer than the charge accumulation period Tshort, so the signal level shown in graph 501 is higher than the signal level shown in graph 502. Note that in order to prevent the charge accumulated in PD 1 from exceeding the saturation level, the pixel signal obtained in the charge accumulation period Tlong is used for a low-luminance subject. On the other hand, the pixel signal obtained in the charge accumulation period Tshort is used for a high-luminance subject.

During dynamic range expansion synthesis, if the signal level is lower than a predetermined level, the signal of the charge accumulation period Tlong is used, and if the signal level is higher than the predetermined level, the signal of the charge accumulation period Tshort is used. Note that upon synthesis, in order to correct the time difference between the charge accumulation period Tlong and the charge accumulation period Tshort, the ratio between the charge accumulation period Tlong and the charge accumulation period Tshort is used for correction, and then the synthesis is performed. For example, if the ratio between the charge accumulation period Tlong and the charge accumulation period Tshort is 4:1, the signal of the charge accumulation period Tshort is multiplied by 4 and then synthesized with the signal of the charge accumulation period Tlong.

By performing the synthesis in this manner, it becomes possible to expand the dynamic range without being limited by the saturation level of charge accumulation in PD 1.

Method for Correcting Variation in FD Capacitance Variations

Next, a method for correcting variation in FD capacitance will be explained.

As mentioned above, the charges held in MEM_LA 6 and MEM_SA 8 are read out to FD 14 via TX_LA 10 and TX_SA 12, respectively, and the charges held in MEM_LB 7 and MES_SB 9 are read out to FD 54 via TX_LB 11 and TX_SB 13, respectively. Although FD 14 and FD 54 are designed to have the same capacitance, in reality they are not completely the same due to the influence of manufacturing variations, and variations in capacitance occur.

Figure 6:
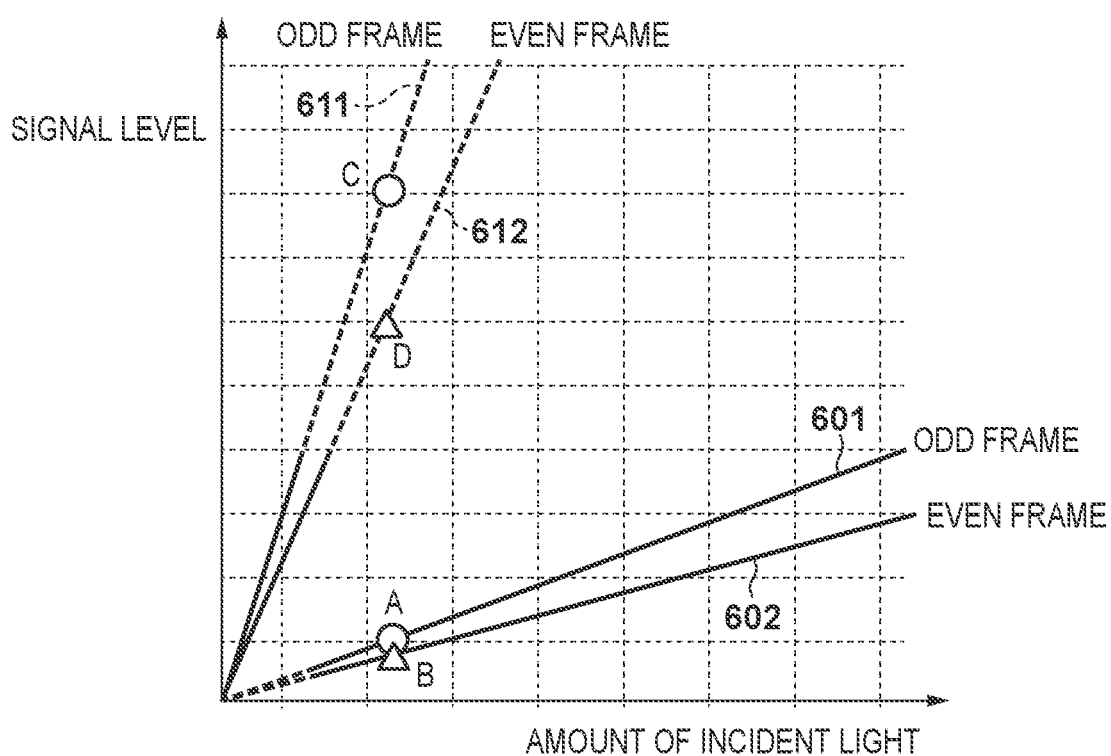
FIG. 6 is a diagram for explaining a method of correcting variations in FD capacitance according to the first embodiment.

FIG. 6 is a diagram showing the relationship between the amount of incident light and the signal level of the signal corresponding to the charge accumulation period Tshort in an arbitrary even frame and odd frame. In FIG. 6, a graph 601 represents an example of the signal level of a signal corresponding to the charge accumulation period Tshort in an odd frame, and a graph 602 represents an example of the signal level of a signal corresponding to the charge accumulation period Tshort in an even frame. Further, a graph 611 represents an example of a signal level obtained by converting the graph 601 according to the ratio of time between the charge accumulation period Tlong and the charge accumulation period Tshort, and a graph 612 represents an example of a signal level obtained by converting the graph 602 according to the ratio of time between the charge accumulation period Tlong and the charge accumulation period Tshort.

If there is a difference in the capacitance of FD 54 and FD 14 used in even and odd frames, as shown in graphs 601 and 602, even if the same amount of light is incident, the signal level generated in each frame will differ. In this state, if the signal level is corrected with the ratio of the charge accumulation periods, as shown in graphs 611 and 612, the signal level A in the odd frame obtained with the charge accumulation period Tshort becomes the signal level C, and the signal level B in the even frame obtained under the same conditions becomes the signal level D. The difference between the pair of signal levels C and D appears as a change in luminance between images output in even frames and odd frames. Therefore, in this embodiment, this difference in signal level is corrected.

In order to correct this signal level difference, in this embodiment, information on correction values for correcting the difference is acquired in advance. Specifically, it is conceivable to acquire the correction data at the time of manufacturing the image capturing apparatus 100. By irradiating the entire surface of the image sensor 111 evenly with light using a light source capable emitting a constant amount of light, and comparing the signal levels of the signals obtained from each pixel 107 in the odd and even frames with the charge accumulation period Tshort, it is possible to obtain correction value that makes the signal levels of odd and even frames the same. The obtained correction value for each pixel 107 is stored in a storage unit (not shown) included in the image capturing apparatus 100.

In this embodiment, using this correction values, the image processing unit 112 performs correction by amplifying the signal level. As the correction is performed by the image processing unit 112, the correction is of digital signal processing. The ratio between the signal level C and the signal level D in each pixel for the same amount of incident light is obtained in advance, and the signal level of either the even frame or the odd frame is corrected.

The correction value is used to correct the difference between the signal level C and the signal level D shown in FIG. 6, and as a specific example, a case will be described in which the ratio of the signal level C to the signal level D of an arbitrary pixel 107 with respect to the same amount of incident light is 1:0.9.

If the signal level of odd frames is higher at a ratio of 1:0.9 for the same amount of incident light, the signal level of odd frames is multiplied by 0.9 in order to match the signal level of the odd frames to that of the even frames, thereby the signal level is corrected. Specifically, in odd frames, the read-out signal value is multiplied by 0.9 by the image processing unit 112, and in even frames, the signal value is multiplied by 1.0 or output as is by the image processing unit 112.

Also, for example, if the ratio of the signal levels of signals output from a certain pixel 107 in an odd frame and in an even frame is 1.1:1, correction is performed by multiplying the signal in the odd frame by 1/1.1.

In this way, in odd frames, by performing correction on the signal from each pixel based on the signal level difference, it is possible to correct the signal to the same level as that in even frames.

Note that in the above example, a case has been described in which the signal obtained with the charge accumulation period Tshort is corrected, but in a case of correcting the signal obtained with the charge accumulation period Tlong, the correction value may be obtained in the same manner. That is, as in the case of the charge accumulation period Tshort, the entire surface of the image sensor 111 is evenly irradiated with light using a light source capable emitting a constant amount of light. Then, the signal levels of the signals obtained from each pixel 107 in an odd frame and in an even frame with the charge accumulation period Tlong are compared, and a correction value is calculated so that the signal levels of the odd and even frames become the same.

Figure 7:
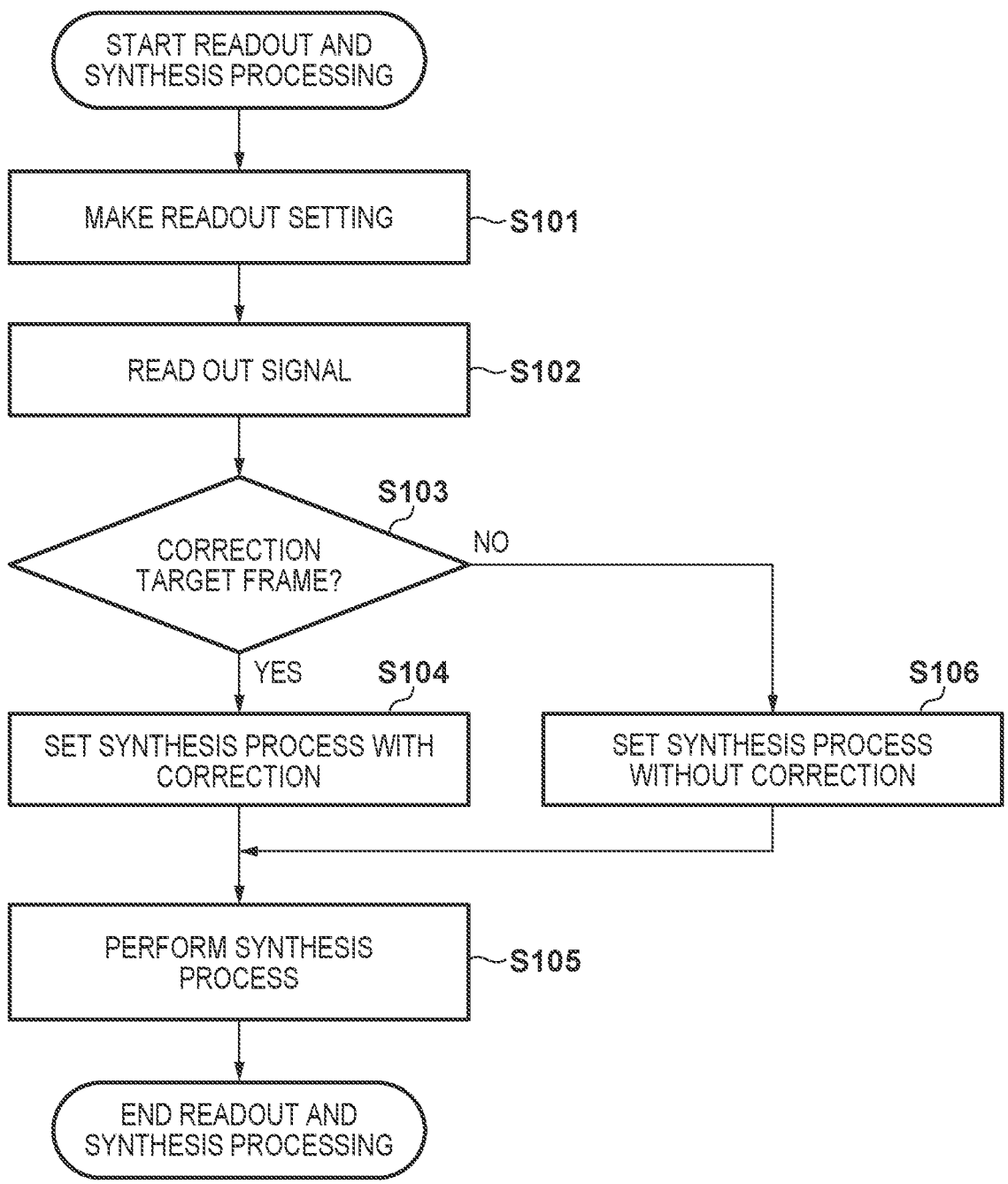
FIG. 7 is a flowchart illustrating processing in the first embodiment.

Next, using FIG. 7, readout and synthesis processing of one frame worth of signal will be described.

When the process of reading out signal from the image sensor 111 is started, in step S101, readout settings for the image sensor 111 are made. Here, whether to control the readout operation using the control for the even frame or using the control for the odd frame shown in FIG. 4 is set. Next, in step S102, a signal from the image sensor 111 is sequentially read out row by row based on the settings. The read-out signal is output to the image processing unit 112.

Next, in step S103, it is determined whether the read frame is a correction target frame. If it is determined that the frame is not a correction target frame, the process advances to step S106, and a synthesis process for expanding the dynamic range without correction is set. In this embodiment, even frames are not correction target frames.

On the other hand, if it is determined in step S103 that the frame is the correction target frame, the process proceeds to step S104, and a synthesis process for expanding the dynamic range with correction is set. The setting of the synthesis process with correction is to perform correction using the above-mentioned correction value before synthesizing images. In this embodiment, odd frames are correction target frames.

Next, in step S105, based on the setting of the synthesis process, a synthesis process is performed to expand the dynamic range of the pixel signals with or without correction, and the processing for one frame is completed.

As described above, according to the first embodiment, the difference in signal level between frames can be corrected by correcting the signal of the correction target frames. Thereby, images with a high dynamic range can be acquired in consecutive frames while suppressing the occurrence of luminance fluctuations between frames.

Furthermore, in addition to correcting the influence of variations in FD capacitance according to this embodiment, since the signal levels between frames are compared using a predetermined amount of incident light and the signal levels are corrected to become the same level, variations in pixels other than FD capacitance can also be corrected.

Further, in the above example, the image processing unit 112 in the image capturing apparatus 100 corrects variations in FD capacitance, however the present invention is not limited to this. For example, image data before dynamic range expansion processing may be output from the image capturing apparatus 100 to an external information processing apparatus, such as a PC, and the dynamic range expansion processing including the above-mentioned correction processing may be performed in the external information processing apparatus.

Modification

Figure 8:
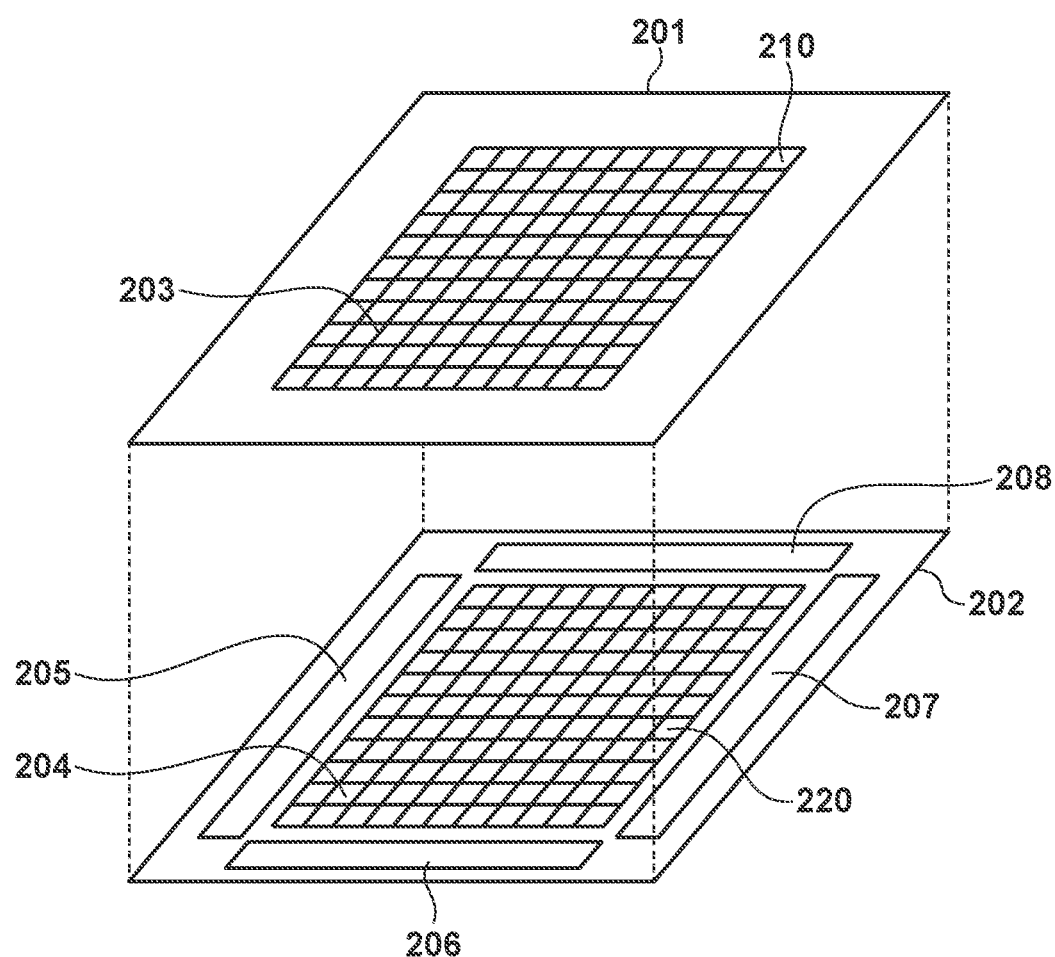
FIG. 8 is a block diagram illustrating a schematic configuration of an image capturing apparatus according to a modification of the first embodiment.

FIG. 8 is a block diagram showing another schematic configuration of the image capturing apparatus 100 according to a modification of the first embodiment, and the image capturing apparatus 100 has a stacked structure in which a pixel area substrate 201 and a signal processing circuit board 202 are stacked. The wiring on the substrates are electrically connected using silicon through electrodes or the like. The pixel area substrate 201 includes a pixel area 203 and the signal processing circuit board 202 includes an image processing circuit area 204, and peripheral circuit areas 205, 206, 207 and 208. The image processing circuit area 204 corresponds to the image processing unit 112.

Further, in the pixel area 203 on the pixel area substrate 201, a plurality of light receiving regions 210 are arranged in a matrix. Further, the signal processing circuit board 202 is provided with a plurality of signal processing units 220 corresponding to the plurality of light receiving regions 210.

Figure 9:
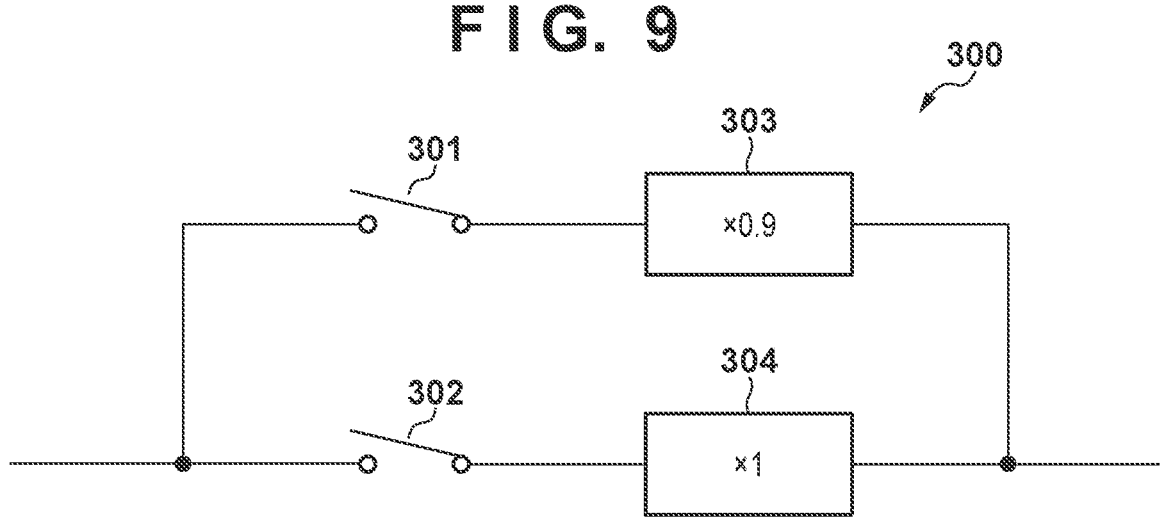
FIG. 9 is a block diagram illustrating an example of a configuration of an amplification unit of an image processing unit according to the modification of the first embodiment.

FIG. 9 shows the configuration of an amplification unit 300 included in each signal processing unit 220. In this modification, the amplification unit 300 is used to correct the signal level difference between frames. As an example, a case will be described in which the ratio of signal level C to signal level D at an arbitrary pixel 107 for the same amount of incident light is 1:0.9.

In odd frames, SW301 is turned on and a gain circuit 303 amplifies the signal by 0.9, and in even frames, SW302 is turned on and a gain circuit 304 amplifies the signal by 1.0, or the signal is output without being amplified. By performing correction in this manner and reducing the amplification factor in odd frames, it is possible to correct the signal levels to the same level as in even frames.

Also, for example, if the ratio of the signal level of the signal in the odd frame output from an arbitrary pixel 107 to the signal level of the signal in the even frame is 1.1:1, the gain circuit 303 is adjusted so that the signal level in the odd frames is multiplied by 1/1.1.

In this way, by setting the value of the gain circuit 303 of the amplification unit 300 in advance according to the ratio of the signal level C and the signal level D in each pixel, the signal difference due to the difference in capacitance between the FD 14 and the FD 54 can be corrected.

As described above, according to the modification, the same effects as in the first embodiment can be obtained using an image capturing apparatus having a stacked structure.

Second Embodiment

Next, a second embodiment of the present invention will be described.

In the first embodiment described above, a case has been described in which signal level difference between frames due to variations in capacitance between the FD 54 and the FD 14 is corrected by signal processing. In contrast, in the second embodiment, a method of correcting the signal level difference by changing the charge accumulation period will be described.

Figure 10:
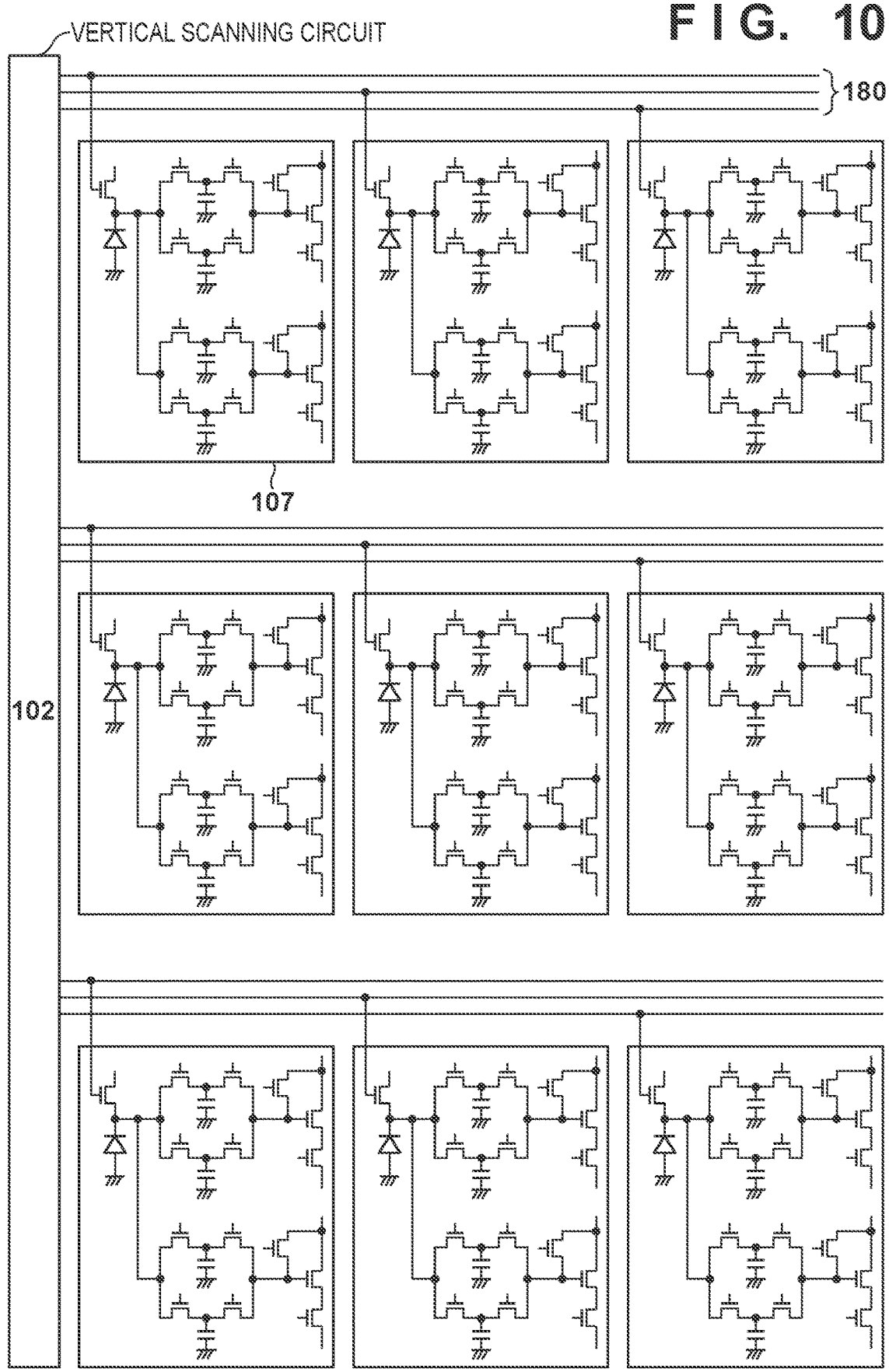
FIG. 10 is an equivalent circuit diagram illustrating a configuration and wiring of a part of pixels according to a second embodiment.

Note that the configuration of the image capturing apparatus 100 in the second embodiment is the same as that shown in FIG. 1, so the description thereof will be omitted here. However, the vertical scanning circuit 102 in this embodiment differs from that in the first embodiment in that the on/off timings of OFG 18 of each pixel 107 can be controlled for each pixel 107. FIG. 10 shows an equivalent circuit diagram including wiring 180 to OFGs 18 for 3×3 pixels. The vertical scanning circuit 102 can control the charge accumulation period of each pixel by controlling the on/off timings of OFG 18 via the wiring 180. Note that the wiring 180 includes the same number of signal lines as the number of pixels included in each row.

Figure 11:
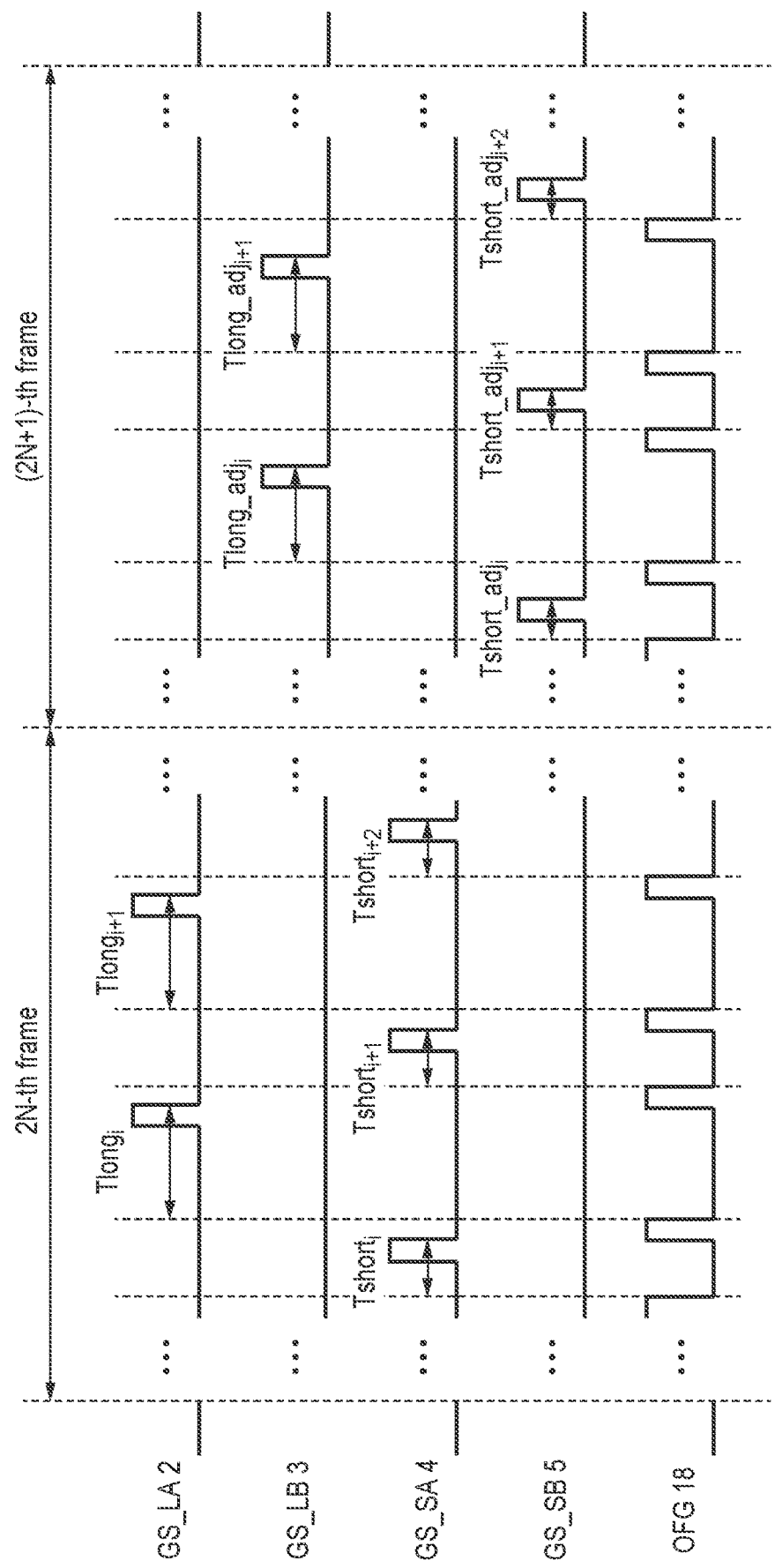
FIG. 11 is a timing chart showing a charge accumulation period of a pixel according to the second embodiment.

FIG. 11 shows a control pattern in a case where the charge accumulation period of odd frames is shortened, and by changing the timing at which OFG 18 is turned off (timing at which charge accumulation starts), the charge accumulation period is shortened.

In even frames, control is performed with the charge accumulation periods Tlong and Tshort, which is the same as the control described using FIG. 3. On the other hand, in odd frames, charges are accumulated in charge accumulation periods Tlong_adj and Tshort_adj that are shorter than the charge accumulation periods Tlong and Tshort, respectively.

As an example, as shown in FIG. 6, in an arbitrary pixel 107, if the signal level is higher in odd frames than in even frames at a ratio of 1:0.9 for the same amount of incident light, the ratio of signal levels between odd and even frames is 1:0.9. Therefore, the ratios of charge accumulation periods Tlong and Tlong_adj and charge accumulation periods Tshort and Tshort_adj are adjusted to have a relationship of 1:0.9.

The charge accumulation period Tshort_adj is a period from when a reset state of PD 1 is released by turning on/off OFG 18 and GS_SB 5 is turned on, through a period of transferring charge generated by PD 1 to MEM_SB 9, to when GS_SB 5 is turned off. This charge accumulation period Tshort_adj is 0.9 times as long as the charge accumulation period Tshort.

Similarly, the charge accumulation period Tlong_adj is a period from when a reset state of PD 1 is released by turning on/off OFG 18 and GS_LB 3 is turned on, through a period of transferring charge generated by PD 1 to MEM_LB 7, to when GS_LB 3 is turned off. This charge accumulation period Tlong_adj is 0.9 times as long as the charge accumulation period Tlong.

Figure 12:
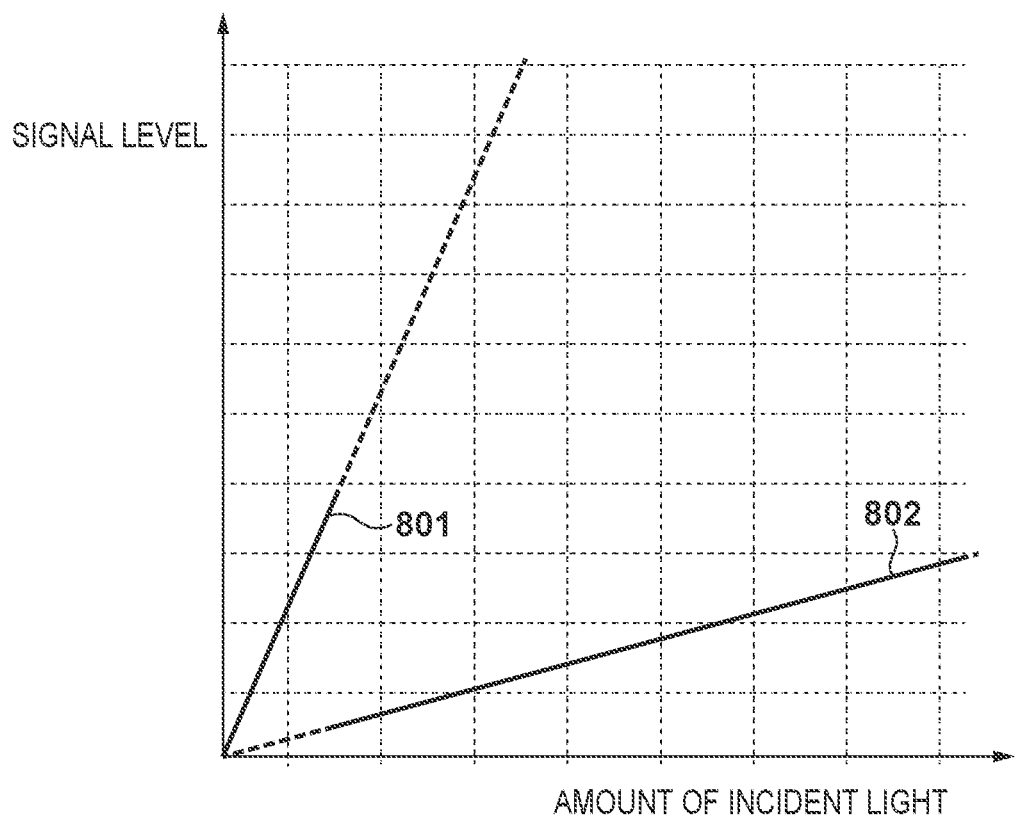
FIG. 12 is a diagram illustrating pixel signal levels for each frame according to the second embodiment.

As a result, as shown in FIG. 12, the signal levels of the signals obtained with charge accumulation period Tlong and with the charge accumulation period Tlong_adj can be made equal as shown in signal 801 both in even frames and odd frames. Further, the signal levels of the signals obtained with the charge accumulation period Tshort and the charge accumulation period Tshort_adj can be made equal as shown in signal 802.

Further, if the ratio of the signal levels of odd frames and even frames output from an arbitrary pixel 107 is 1.1:1, for example, the charge accumulation period Tlong_adj and the charge accumulation period Tshort_adj are adjusted so that the ratio of the charge accumulation periods Tlong and Tlong_adj and the ratio of the charge accumulation periods Tshort and Tshort_adj have the relationship of 1/1.1.

In this way, by adjusting the charge accumulation periods in odd frames, the difference in signal level between odd frames and even frames can be reduced. By setting the control of the charge accumulation periods described above in advance according to the ratio of the signal levels obtained with the charge accumulation period Tlong and the ratio of the charge accumulation period Tshort in each pixel between an odd frame and an even frame, the signal due to the difference in capacitance between the FD 14 and FD 54 can be corrected.

Figure 13:
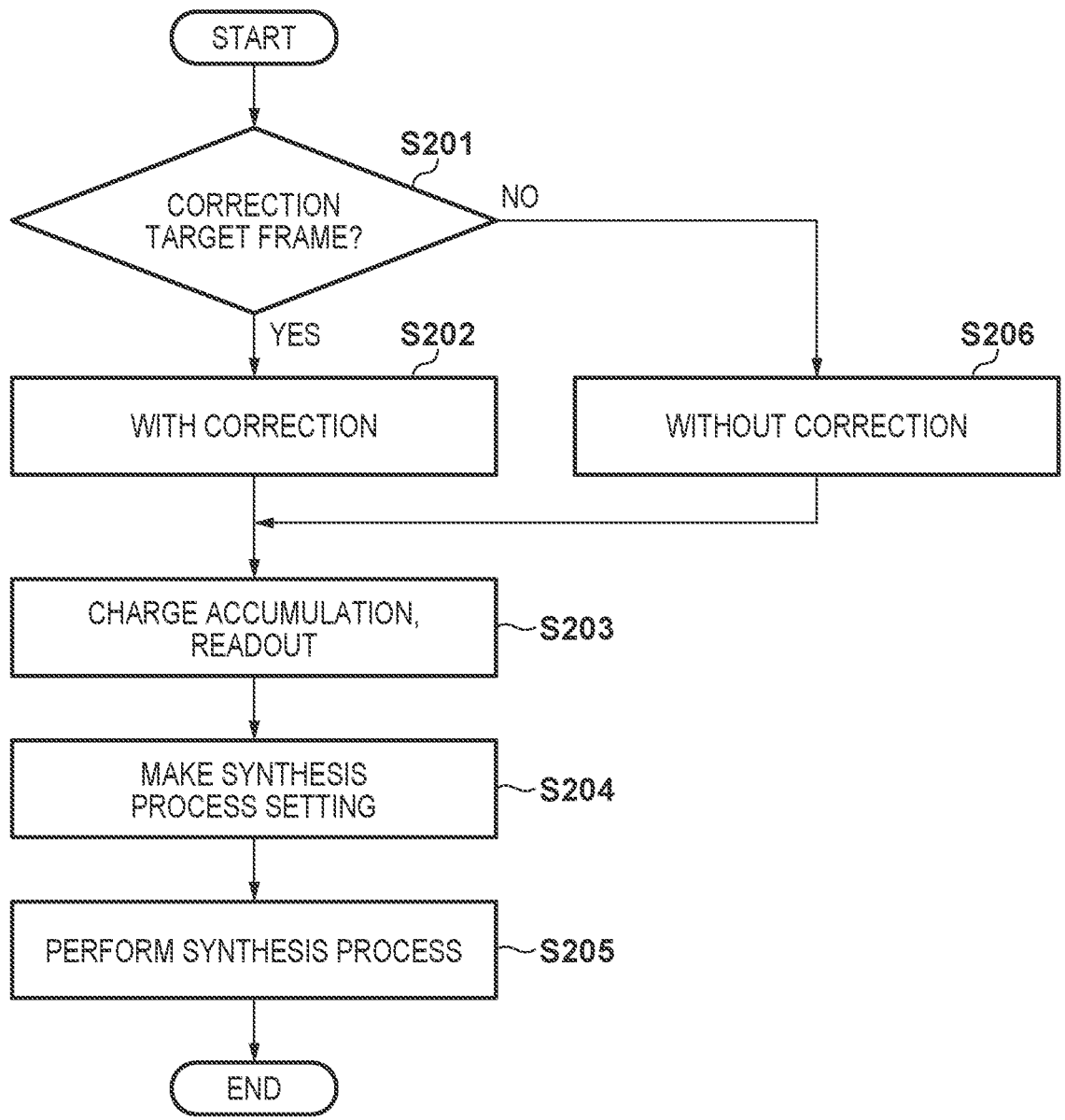
FIG. 13 is a flowchart illustrating processing in the second embodiment.

Next, a series of processing from charge accumulation to signal synthesis will be explained using FIG. 13.

When the processing in the image sensor 111 is started, in step S201, it is determined whether or not the frame in which charge is to be accumulated is a correction target frame. If it is determined in step S201 that the frame is not a correction target frame, the process proceeds to step S206, and the image sensor 111 is set to be controlled without correction of the charge accumulation periods of the image sensor 111. In this embodiment, even frames are not correction target frames.

On the other hand, if it is determined in step S201 that the frame is the correction target frame, the process proceeds to step S202, and the image sensor 111 is set to be controlled with correction of the charge accumulation periods of the image sensor 111. In this embodiment, odd frames are correction the target frame, and it is set that the charge accumulation periods are changed according to the preset ratio of signal level as described above.

Next, in step S203, charge accumulation and readout processing in each pixel 107 of the image sensor 111 is executed based on the set conditions. The read-out charges are output from the output circuit 105 to the image processing unit 112 as a pixel signal.

In step S204, the image processing unit 112 makes settings of dynamic range expansion processing including signal adjustment based on the ratio of the charge accumulation periods. At this time, the settings are made based on the ratio between the charge accumulation period Tlong and the charge accumulation period Tshort before the adjustment. Next, in step S205, a synthesis process for expanding the dynamic range of the pixel signals is performed based on the settings for the synthesis process, and the processing for one frame is completed.

As described above, according to the second embodiment, the signal level difference between frames can be corrected by correcting the charge accumulation periods for correction target frames. Thereby, images with a high dynamic range can be acquired in consecutive frames while suppressing the occurrence of luminance fluctuations between frames.

Note that in the above example, a case has been described in which the charge accumulation period is controlled by controlling the timing at which OFG 18 is turned off. Alternatively, the charge accumulation period may be controlled by changing the timing of charge transfer from PD 1 to MEM_LB 7 or from PD 1 to MEM_SB 9 by GS_LB 3 and GS_SB 5, respectively.

Alternatively, the image capturing apparatus 100 may have a stacked structure, and an actuation circuit for actuating each pixel 107 may be provided for each pixel.

Third Embodiment

Next, a third embodiment of the present invention will be described.

In the third embodiment, a case will be described in which the luminance difference between even frames and odd frames is reduced by controlling the amplification factor when amplifying signals with the amplifiers of the column circuit 103. Note that the configuration of the image capturing apparatus 100, the method of controlling charge accumulation, and the readout control are the same as those described in the first embodiment, so description thereof will be omitted here.

Figure 14:
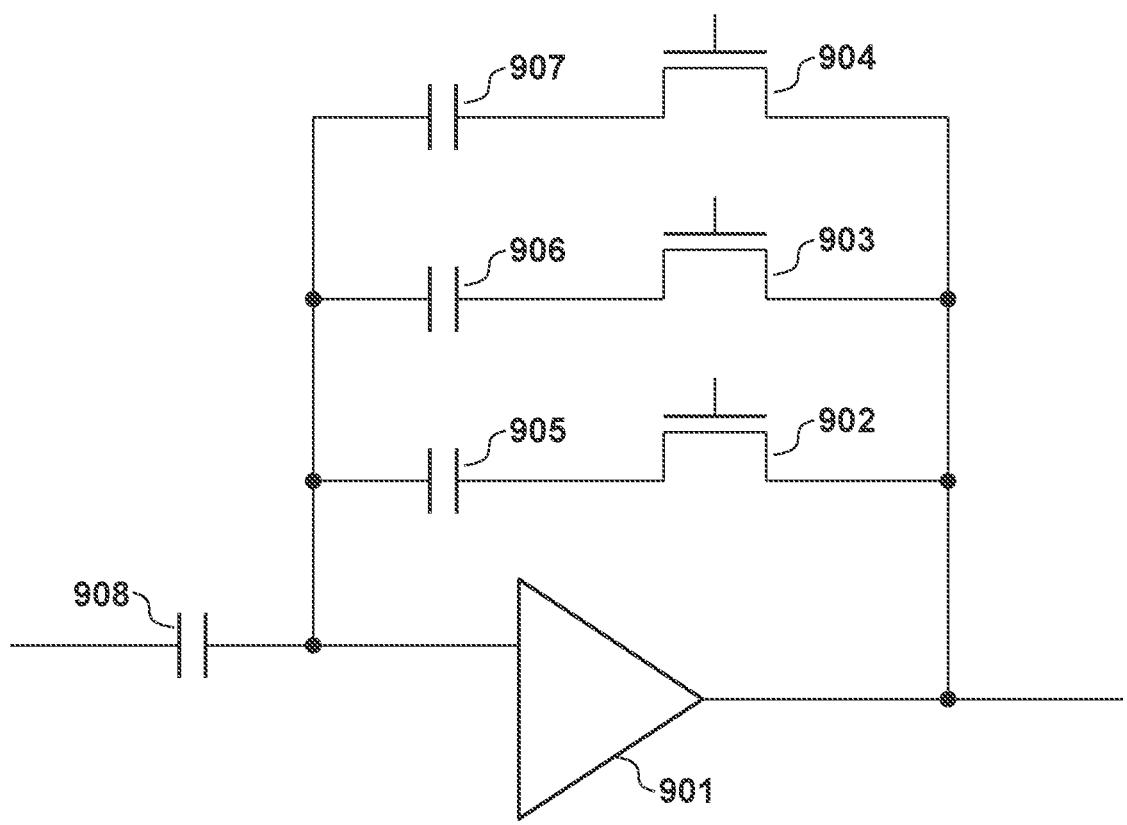
FIG. 14 is a circuit diagram showing an example of a configuration of an amplifier of a column circuit according to a third embodiment.

In the third embodiment, the column circuit 103 has a configuration in which an amplification factor can be selectively changed using an operational amplifier 901 by turning on/off switches SWa 902, SWb 903, and SWc 904, as shown in FIG. 14.

For example, an amplification factor when the switch SWa 902 is turned on is Ci/Cfa, which is the capacitance ratio of the capacitance Ci of a capacitor 908 and the capacitance Cfa of a capacitor 905. Further, when both switches SWa 902 and SWb 903 are turned on, the amplification factor is Ci/(Cfa+Cfb), which is the ratio of the capacitance Ci of the capacitor 908 to the sum of the capacitance Cfa of the capacitor 905 and the capacitance Cfb of a capacitor 906. In this embodiment, it is assumed that the circuit is configured such that when the switch SWa 902 is turned on, the amplification factor becomes 1.1, and when both the switches SWa 902 and SWb 903 are turned on, the amplification factor becomes 1.0.

Furthermore, when both switches SWa 902 and SWc 904 are turned on, the amplification factor is Ci/(Cfa+Cfc), which is the ratio of the capacitance Ci of the capacitor 908 to the sum of the capacitance Cfa of the capacitor 905 and the capacitance Cfc of a capacitor 907. In this embodiment, it is assumed that the circuit is configured so that when both the switches SWa 902 and SWc 904 are turned on, the amplification factor becomes 0.9.

In this embodiment, the ratio of the signal levels of an odd frame and an even frame in each pixel is calculated, and if the ratio exceeds ±10%, for example, the switch is selected so that if the signal level of the odd frame is larger, the signal level of the odd frame is reduced by 0.9 times and if the signal level of the odd frame is smaller, the signal level is increased by 1.1 times. This information is stored for each pixel and the switches are controlled so that when a signal is read out to the column circuit 103, the appropriate switch/switches is/are turned on.

Note that with this control, unlike the methods in the first and second embodiments, it is not possible to match the signal levels of odd frames and even frames of all pixels, but it is possible to make them close, so the luminance difference between frames can be reduced.

Figure 15:
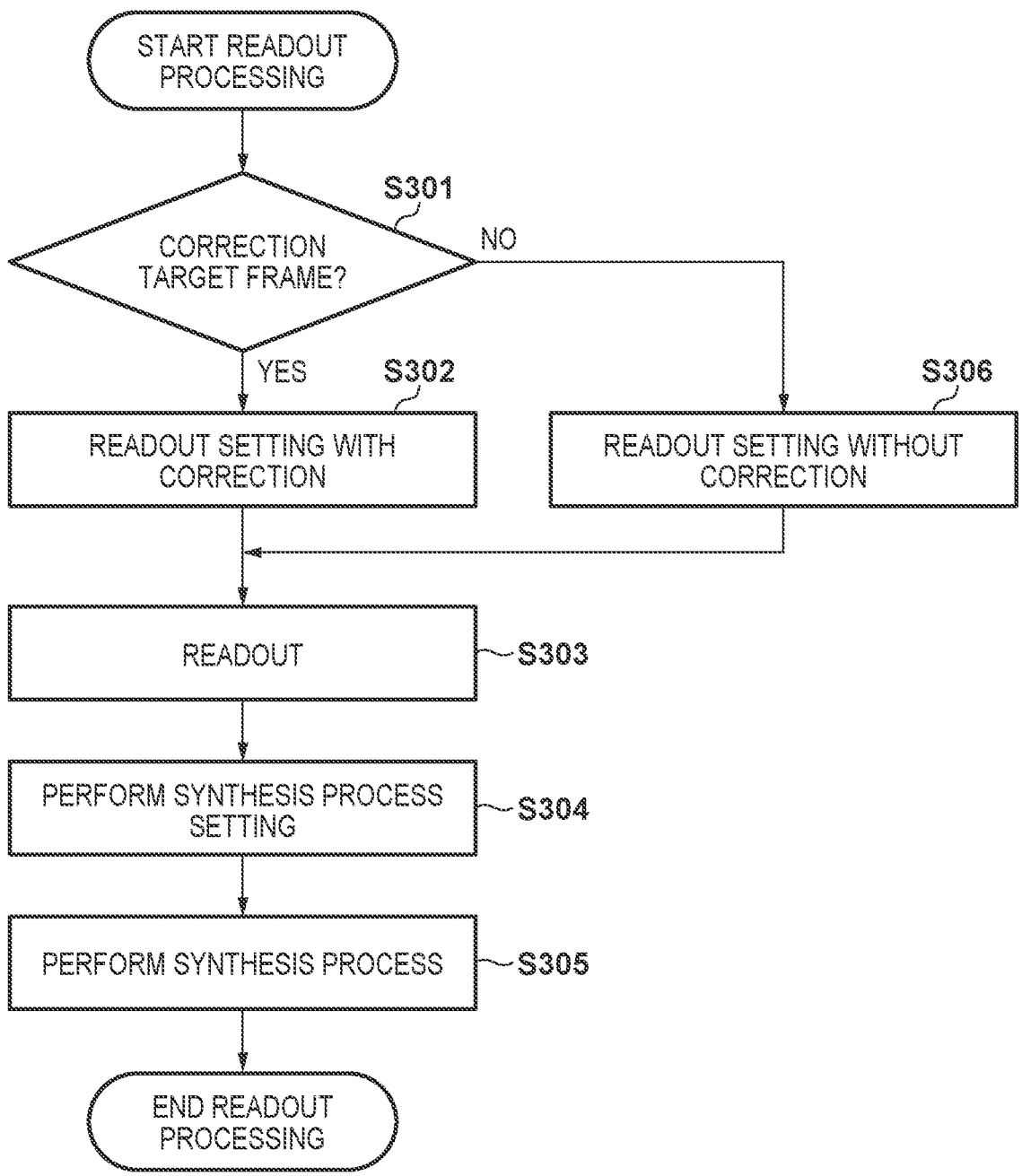
FIG. 15 is a flowchart illustrating processing in the third embodiment.

Next, the processing at the time of signal readout will be described using FIG. 15.

When the process of reading out charges from the image sensor 111 is started, in step S301 it is determined whether the frame to be scanned is a correction target frame. If it is determined in step S301 that the frame is not a correction target frame, the process advances to step S306, and readout operation without correction is set for the image sensor 111. In this embodiment, even frames are not correction target frames.

On the other hand, if it is determined in step S301 that the frame is the correction target frame, the process advances to step S302, and readout operation with correction is set for the image sensor 111. In this embodiment, odd frames are correction target frames, and by controlling switches SWa 902, SWb 903, and SWc 904 in the amplifier of the column circuit 103 for each pixel to change the amplification factor, the luminance difference between even frames and odd frames can be reduced.

Next, in step S303, a readout process is executed in which the pixel signal of each pixel 107 of the image sensor 111 is amplified by the amplifier of the column circuit 103 with the set amplification factor to be read out. The read-out pixel signal is output from the output circuit 105 to the image processing unit 112.

In step S304, the image processing unit 112 performs settings for dynamic range expansion processing, including signal adjustment based on the amplification factor of the amplifier. Next, in step S305, a synthesis process for expanding the dynamic range of the pixel signals is performed based on the settings of the synthesis process, and the processing for one frame is completed.

As described above, according to the third embodiment, by correcting the signal of the correction target frame using analog gain, it is possible to reduce the difference in signal level between frames. Thereby, images with a high dynamic range can be acquired in consecutive frames while suppressing luminance fluctuations between frames.

In this embodiment, the threshold value of the signal level ratio is set to, for example, ±10%, and one of three types of amplification factors is selected, but the present invention is not limited to this. For example, one of five or more types of amplification factors may be selected using a plurality of threshold values. By doing so, it is possible to further suppress luminance fluctuations between frames.

Note that in the first to third embodiments described above, the signal levels of odd frames are corrected to match the signal levels of the even frames, but the present invention is not limited to this. Any correction that matches the signal levels may be adopted. For example, the signal levels of even frames may be adjusted to the signal levels of odd frames, or the signal levels may be adjusted to the median value of the difference instead of adjusting to signal levels of either odd or even frames.

Further, a configuration may be adopted in which the first to third embodiments described above are executed in combination as appropriate. For example, it is possible to combine the method of performing correction by changing the charge accumulation periods described in the second embodiment and the method of performing correction using digital gain described in the first embodiment. If correction is performed only using the method of the first embodiment, the noise component will also be amplified, but by performing the correction before transferring charge from the charge storage section, the amplification of the noise component can be minimized.

It is also conceivable to combine the method of performing correction using analog gain described in the third embodiment and the method of performing correction using digital gain described in the first embodiment.

OTHER EMBODIMENTS

The present invention may be applied to a system composed of a plurality of devices, or to an apparatus composed of a single device.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-021870, filed Feb. 15, 2023 which is hereby incorporated by reference herein in its entirety.

What is claimed is:

1. An image capturing apparatus comprising:
a plurality of pixels; and
a correction unit,
wherein each pixel includes:
   a photoelectric converter that photoelectrically converts incident light into charge and accumulates the charge;
   first and second charge holding sections that hold charges obtained by the photoelectric converter with first and second charge accumulation periods, respectively, in a first frame;
   third and fourth charge holding sections that hold charges obtained by the photoelectric converter with the first and second charge accumulation periods, respectively, in a second frame following the first frame;
   a first floating diffusion portion used for reading out first and second signals corresponding to charges held in the first and second charge holding sections, respectively, in the second frame; and
   a second floating diffusion portion used for reading out third and fourth signals corresponding to charges held in the third and fourth charge holding sections, respectively, in the first frame,
wherein the correction unit corrects a difference between signal levels of a pair of signals corresponding to charges obtained in a predetermined charge accumulation period with a same amount of incident light and read out via the first and second floating diffusion portions based on a difference between capacitances of the first and second floating diffusion portions.

2. The image capturing apparatus according to claim 1, wherein the correction unit corrects to suppress the difference between the signal levels based on a ratio of signal levels of a pair of signals corresponding to charges obtained in a predetermined charge accumulation period with a same amount of incident light and read out via the first and second floating diffusion portions.

3. The image capturing apparatus according to claim 1, wherein the correction unit corrects at least one of the first signal and the third signal, and at least one of the second signal and the fourth signal.

4. The image capturing apparatus according to claim 1 further comprising a control unit that controls the charge accumulation periods for the plurality of pixels,
wherein the correction unit corrects at least one of the first and second charge accumulation periods for each pixel in at least one of the first frame and the second frame.

5. The image capturing apparatus according to claim 1, wherein the correction unit amplifies at least one of the first signal and the third signal.

6. The image capturing apparatus according to claim 1 further comprising a storage unit that stores a correction value, for each pixel, predetermined in advance,
wherein the correction unit performs correction using the correction value stored in the storage unit.

7. The image capturing apparatus according to claim 1, wherein the first charge accumulation period and the second charge accumulation period have different lengths, and
the image capturing apparatus further comprises a synthesis unit that synthesizes the first and the second signals, and the third and the fourth signals after adjusting the signals based on a ratio of the first charge accumulation period and the second charge accumulation period.

8. The image capturing apparatus according to claim 1, wherein the first and second charge accumulation periods in each pixel are controlled by controlling timings of releasing a reset state of the photoelectric converter.

9. The image capturing apparatus according to claim 1, wherein the first and second charge accumulation periods in each pixel are controlled by controlling timing of transferring charge from the photoelectric converter to the first to fourth charge holding sections.

10. An image processing apparatus for processing a signal output from an image capturing apparatus comprising a plurality of pixels, each pixel including:

a photoelectric converter that photoelectrically converts incident light into charge;

first and second charge holding sections that hold charges obtained by the photoelectric converter with first and second charge accumulation periods, respectively, in a first frame;

third and fourth charge holding sections that hold charges obtained by the photoelectric converter with the first and second charge accumulation periods, respectively, in a second frame following the first frame;

a first floating diffusion portion used for reading out first and second signals corresponding to charges held in the first and second charge holding sections, respectively, in the second frame; and a second floating diffusion portion used for reading out third and fourth signals corresponding to charges held in the third and fourth charge holding sections, respectively, in the first frame, the image processing apparatus comprising a correction unit that corrects a difference between signal levels of a pair of signals corresponding to charges obtained in a predetermined charge accumulation period with a same amount of incident light and read out via the first and second floating diffusion portions based on a difference between capacitances of the first and second floating diffusion portions.

11. The image processing apparatus according to claim 10, wherein the correction unit corrects to suppress the difference between the signal levels based on a ratio of signal levels of a pair of signals corresponding to charges obtained in a predetermined charge accumulation period with a same amount of incident light and read out via the first and second floating diffusion portions.

12. The image processing apparatus according to claim 10, wherein the correction unit corrects at least one of the first signal and the third signal, and at least one of the second signal and the fourth signal.

13. The image processing apparatus according to claim 10, wherein the first charge accumulation period and the second charge accumulation period have different lengths, and the image processing apparatus further comprises a synthesis unit that synthesizes the first and the second signals, and the third and the fourth signals after adjusting the signals based on a ratio of the first charge accumulation period and the second charge accumulation period.

14. An control method of an image capturing apparatus having a plurality of pixels, each pixel including:

a photoelectric converter that photoelectrically converts incident light into charge and accumulates the charge;

first and second charge holding sections that hold charges obtained by the photoelectric converter with first and second charge accumulation periods, respectively, in a first frame;

third and fourth charge holding sections that hold charges obtained by the photoelectric converter with the first and second charge accumulation periods, respectively, in a second frame following the first frame;

a first floating diffusion portion used for reading out first and second signals corresponding to charges held in the first and second charge holding sections, respectively, in the second frame; and a second floating diffusion portion used for reading out third and fourth signals corresponding to charges held in the third and fourth charge holding sections, respectively, in the first frame, the method comprising correcting a difference between signal levels of a pair of signals corresponding to charges obtained in a predetermined charge accumulation period with a same amount of incident light and read out via the first and second floating diffusion portions based on a difference between capacitances of the first and second floating diffusion portions.

15. A non-transitory computer-readable storage medium, the storage medium storing a program that is executable by the computer, wherein the program includes program code for causing the computer to function as an image processing apparatus for processing a signal output from an image capturing apparatus comprising a plurality of pixels, each pixel including: a photoelectric converter that photoelectrically converts incident light into charge; first and second charge holding sections that hold charges obtained by the photoelectric converter with first and second charge accumulation periods, respectively, in a first frame; third and fourth charge holding sections that hold charges obtained by the photoelectric converter with the first and second charge accumulation periods, respectively, in a second frame following the first frame; a first floating diffusion portion used for reading out first and second signals corresponding to charges held in the first and second charge holding sections, respectively, in the second frame; and a second floating diffusion portion used for reading out third and fourth signals corresponding to charges held in the third and fourth charge holding sections, respectively, in the first frame, the image processing apparatus comprising a correction unit that corrects a difference between signal levels of a pair of signals corresponding to charges obtained in a predetermined charge accumulation period with a same amount of incident light and read out via the first and second floating diffusion portions based on a difference between capacitances of the first and second floating diffusion portions.

* * * * *